United States Patent
Asenbrygg et al.

(10) Patent No.: US 8,070,847 B2
(45) Date of Patent: *Dec. 6, 2011

(54) SUBSTRATE HAVING CORRUGATED SHEET(S) AND CHANNEL(S) FOR TREATING EXHAUST GASES OF COMBUSTION ENGINES

(75) Inventors: Juha-Matti Asenbrygg, Hietama (FI); Pekka Matilainen, Jyvaskyla (FI); Ari Lievonen, Vaajakoski (FI); Erkki Narhi, Vihtavuori (FI); Kati Lehtoranta, Jyvaskyla (FI)

(73) Assignee: Ecocat Oy, Vihtavuori (FI)

( * ) Notice: Subject to any disclaimer, the term of this patent is extended or adjusted under 35 U.S.C. 154(b) by 386 days.

This patent is subject to a terminal disclaimer.

(21) Appl. No.: 12/298,435

(22) PCT Filed: Apr. 23, 2007

(86) PCT No.: PCT/FI2007/000105
§ 371 (c)(1),
(2), (4) Date: Dec. 12, 2008

(87) PCT Pub. No.: WO2007/122285
PCT Pub. Date: Nov. 1, 2007

(65) Prior Publication Data
US 2009/0173228 A1  Jul. 9, 2009

(30) Foreign Application Priority Data

Apr. 24, 2006 (WO) .................. PCT/FI2006/000129

(51) Int. Cl.
*B01D 50/00* (2006.01)
(52) U.S. Cl. ................. 55/484; 55/525; 55/524; 55/482; 55/486; 55/489; 55/487; 55/385.3; 55/521; 55/529; 55/DIG. 10; 55/DIG. 30; 95/287; 422/180; 29/428; 60/311

(58) Field of Classification Search .................... 55/525, 55/524, DIG. 10, DIG. 30, 484, 482, 486–489, 55/385.3, 521, 529; 422/180; 95/287; 29/428; 60/311

See application file for complete search history.

(56) References Cited

U.S. PATENT DOCUMENTS
4,647,435 A * 3/1987 Nonnenmann ................ 422/180
(Continued)

FOREIGN PATENT DOCUMENTS
DE           3744265         7/1989
(Continued)

OTHER PUBLICATIONS

European Search Report in Corresponding Application No. EP 07 73 0574 Dated Apr. 6, 2010. International search report in corresponding PCT/FI2007/000105.

*Primary Examiner* — Jason M Greene
*Assistant Examiner* — Dung H Bui
(74) *Attorney, Agent, or Firm* — Young & Thompson

(57) ABSTRACT

A substrate has corrugated sheet(s) and channel(s) for treating exhaust gases of combustion engines. The present invention also relates to methods for manufacturing and using the substrate having the open channel(s). The substrate (1) includes at least one corrugated sheet (3) having depressions (3*d*) and one flat wire mesh sheet (2) having depressions (2*d*) which is connected to the corrugated sheet (3) and between the flat wire mesh sheet (2) and the corrugated sheet (3) there are at least partially open channels (POC) for exhaust gas (EG) flow, and the depth of depression (2*d*) of the flat wire mesh sheet (2) is 0.05-2.0 mm smaller than the height of the corrugation (3*c*) of the corrugated sheet (3).

20 Claims, 1 Drawing Sheet

Figure 1:
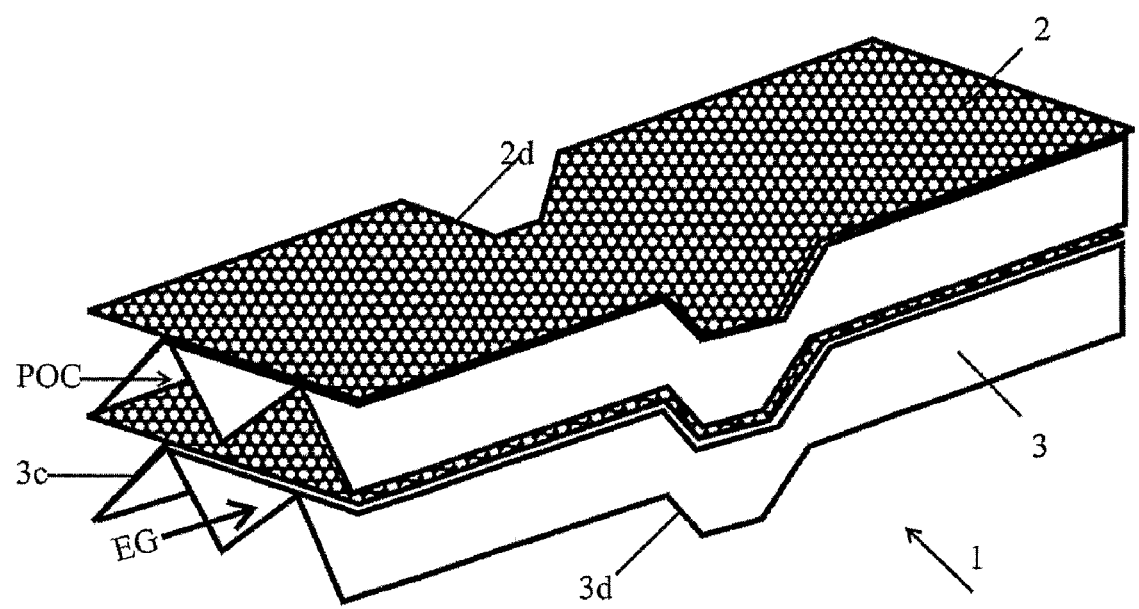

| U.S. PATENT DOCUMENTS | | | | | FOREIGN PATENT DOCUMENTS | | |
|---|---|---|---|---|---|---|---|
| 4,665,051 | A | * | 5/1987 | Nonnenmann ............... 502/439 | DE | 102004001947 | 8/2005 |
| 5,045,403 | A | * | 9/1991 | Maus et al. ................... 428/593 | EP | 0298943 | 1/1989 |
| 5,853,902 | A | | 12/1998 | Usui | EP | 0434539 A1 | 6/1991 |
| 7,709,076 | B2 | * | 5/2010 | Maus et al. ................... 428/116 | GB | 2065494 A | 7/1981 |
| 2007/0116977 | A1 | | 5/2007 | Maus et al. | | | |

\* cited by examiner

SUBSTRATE HAVING CORRUGATED SHEET(S) AND CHANNEL(S) FOR TREATING EXHAUST GASES OF COMBUSTION ENGINES

The present invention relates a substrate having corrugated sheet(s) and channel(s) for treating exhaust gases of combustion engines. The present invention also relates to methods for manufacturing said substrate having said open channel(s).

BACKGROUND OF THE INVENTION

For the treatment of exhaust gases of combustion engines substrates having open or closed channels or combinations of those is used. In open channels the exhaust gas is directly flowing through the substrate. In substrate having closed channels exhaust gas is forced to flow through walls, e.g. through ceramic or metallic porous walls. In open channels the reduction of gaseous impurities is often high but the reduction of impurity particles is low, e.g. from 10 to 15%. In closed channels/wall flow filters the reduction of gaseous impurities is high and also the reduction of impurity particles is high, e.g. from 70 to 99%. The problem in closed channels is the clogging of walls. Closed channels/wall flow filters will gradually wholly clog if they are not cleaned. Pressure loss will also increase. One way to keep the channels open is to clean them continuously or periodically.

DISCLOSURE OF THE INVENTION

A substrate that efficiently reduces particles and gas impurities of exhaust gas in open channels has now been invented. Accordingly a method for manufacturing said substrate has also been invented.

Constructional embodiments of the invention are not limited in any way. According to an embodiment of the invention, the catalyst of the invention can be present in several structures assembled parallel or in series with respect to the flow direction or cascade with POC/DPF-structure/substrates.

According to an embodiment of the invention the substrate comprises corrugated sheet(s) having depressions connected to flat wire mesh sheet(s) and between said flat wire mesh sheet and said corrugated sheet there are at least partially channel(s) for exhaust gas flow and the depth of depression is 0.05-2.0 mm, e.g. 0.05-0.5 mm or 0.5-1.5 mm, smaller than the height of the corrugation.

It has been surprisingly discovered that the reduction of particles flowing in open channels is essentially improved. Also the reduction of impurity gases in at least partially open channels is improved.

Preferably the depth of the depression is 0.2-2.0 mm and the height of the corrugation is 0.5-4.0 mm, such as 1.0-3.0 mm. This combination is very effective both in reduction of particles and in the reduction of impurity gases. The depressions can be e.g. 10-40 mm, such as 20-30 mm, from each other.

Exhaust gas can freely flow through partially open channels but on the surfaces of sheet the gas flow rate is reduced due to irregular surface of wire mesh sheet(s) and due to depressions of sheets. Direction of open channels can vary. It can be 0 to 90 degree compared to the direction of the substrate (X-direction). These irregular surfaces and depressions also mix the gas thus minimizing standard deviation of gas retention time. The surfaces of wire mesh sheet(s) also act as an effect open particle trap for exhaust gas particles. This combination adds contacts of impurity of gases and particles thus adding retention time and reduction of impurities and particles. Impurity particles are more often attached to mesh sheet compared to smooth sheet. Especially heavy and large particles are attached on the surfaces of wire mesh sheet(s).

The reduction of particles is very much depending on the particle source and composition of particles. Particles can include various amount Volatile Organic Compounds (VOF's), solid carbon, sulphur, water and metal oxides. A standard oxidation catalyst can oxidize majority VOF's and reduce this way 10 to 60% of particle mass. With the new invention it is possible to improve particle reduction even up to 80%. With the new invention it is possible to improve reduction of gas impurities >90%.

An important character of new partially open channel is that it is not clogging at all or the clogging is minimal compared to closed channels or filters, which will gradually wholly clog if they are not cleaned. This is very important and the substrate having at least partially open channels according to the invention can be used in most demanding conditions and they are useful in many applications.

The particles attached to the surfaces of at least partially open channel(s) break down to gaseous impurities, which further decompose to harmless compounds. Part of gas can flow through openings of mesh sheet(s) and particles attach on surfaces of sheet(s). Also this leads to better reduction of particles. On the other hand partially open channels do not clog or the clogging is minimal and pressure loss and flow rate of gas are not reduced near the sheet(s). This reduces failure in operation thus adding efficiency of the partially open channel.

The shape of openings of mesh sheet(s) can vary. It can be canal-likes square-like, diamond-like or hole-like. E.g. in diamond-like mesh sheet the wires can be at one level or they can be crosswise.

Pressure difference between sides of the mesh sheet(s) adds flowing of exhaust gas through pores of the mesh sheet. This phenomenon leads to attachments of particles on support and better reduction of particles from exhaust gas.

According to an embodiment of the invention said corrugated sheet is a corrugated wire mesh sheet. This adds contacts of impurity gases and particles thus adding retention time and reduction of impurities. This leads to better reduction values of impurity particles of exhaust gas. Collision of gas also leads to better contact of gas with catalytically active material thus improving reduction of gaseous impurities and adding retention time of particles in said substrate.

Preferably, there are open channels with both sizes of said mesh sheet. The structure of wire mesh sheet is simply, they are easy to manufacture and the reduction of particles is high compared e.g. smooth sheet used in open channels.

According to an embodiment of the invention said flat wire mesh sheet has depressions. Also this adds reduction of impurity gases particles by reducing flow rate of impurity gases and adding attachment of particles on support.

According to an embodiment of the invention depressions of the corrugated sheet have been matched to the depressions of the flat wire mesh sheet. This leads to better strength of the substrate because its locking layers to each other.

According to an embodiment of the invention the median opening size of mesh sheet is from 0.01 to 0.5 mm, preferably from 0.05 to 0.3 mm, such as from 0.08 to 0.2 mm.

According to an embodiment of the invention the mesh diameter is 0.02-0.24 mm. The mesh diameter is preferably 0.1-0.15 mm. Then the mechanical strength is high and pressure loss of gas flow is low.

According to an embodiment of the invention mesh number of the mesh sheet is from 30 to 500. At least part of exhaust gas can flow through the openings of mesh sheets. This leads to attachment of particles of exhaust gas to the surfaces of support giving essentially better reduction of particles.

According to an embodiment of the invention said flat wire mesh sheet and said corrugated sheet have been attached to each other by welding/brazing. This leads to better strength of the substrate.

According to an embodiment of the invention said sheet(s) have been at least partially covered by support and/or catalytic material. Preferable median pore size of said support is over 5 nm, preferably from 10 to 50 nm, such as from 15 to 20 nm. Optimal pore size of the support also depends on exhaust gases and circumstances of gas flow near mesh sheet(s). Exhaust gases can have e.g. median particle size from 5 to 200 nm and median pore size can e.g. be from 5 to 20 nm.

Preferable support comprises coarse particles and/or fibres, which are projecting out from the plane of said support. Preferably the support has the median particle size over 0.4 µm, such as from 1.5 to 3.5 µm. This essentially adds the adhesion of particles thus improving the reduction of particles in said substrate According to an embodiment of the invention sheet(s) has (have) been essentially covered with a support having the median particle size over 1.4 mm and/or having pores over 10 nm. This also improves reduction of impurity particles by adding attachment of particles to sheets.

Particles of exhaust gas of combustion engines can be efficiently treated with substrate having mesh sheet(s) partially open channels according to the invention. The reduction of impurity particles is surprisingly high compared to traditional substrates. Also the reduction of gaseous impurities is high. The mesh sheet(s) according to the invention does not clog or the clogging is minimal so that it does not have effect s on flowing rate of exhaust gas in substrate. Also pressure loss in substrate is minimal.

The substrate can e.g. be a particle oxidation catalyst (POC) or SCR catalyst. It can also be a hydrolysis catalyst. The substrate can be preferably used to purify impurity particles of exhaust gases of combustion engines. The structure of substrate can vary. It can be e.g. wound or stacked or folded.

DETAILED DESCRIPTION OF THE INVENTION

Now some embodiments of the present invention will be described in more detail with reference to the appended drawings.

FIG. 1 shows a substrate having corrugated sheet having depressions and a flat wire mesh sheet.

In FIG. 1 substrate 1 comprises corrugated smooth sheets 3 having depressions 3d and flat wire mesh sheets 2 having depressions 2d. These sheets are connected to each other and between said sheets 2, 3 there are partially open channels POC for exhaust gas EG flow. The depressions 3d of the corrugated sheet 3 has been matched to the depressions 2d of the flat wire mesh sheet 2. The depth of depression 2d of said flat wire mesh sheet 2 is smaller than the height of the corrugation 3c of said corrugated sheet 3. In this embodiment the depth of the depression 2d, 3d is about 1 mm and the height of the corrugation 3c is about 2 mm.

The invention claimed is:

1. A substrate having corrugated sheet(s) and flat wire mesh sheet(s), and between said flat sheet(s) and said corrugated wire mesh sheet(s) there are at least partially open channels (POC) for treating exhaust gases of combustion engines, wherein said corrugated sheet is a corrugated wire mesh (3) sheet having depressions (3d) and said flat wire mesh sheet (2) have depressions (2d), and the depth of depression (2d) of said flat wire mesh sheet (2) is 0.05-2.0 mm smaller than the height of the corrugation (3c) of said corrugated sheet (3) and said wire mesh sheets (2, 3) have irregular surface having median opening size of 0.01 to 0.5 mm and mesh diameter 0.02 to 0.24 mm, and said depressions (3d) of the corrugated sheet (3) are matched to the depressions (2d) of the flat wire mesh sheet (2), and said wire mesh sheet (2, 3) is strengthened in inlet area of exhaust gas and at connection area of corrugated sheet(s) (3) and wire mesh sheet(s) (2).

2. A substrate according to claim 1, wherein median opening size of said wire mesh sheet (2, 3) is 0.05 to 0.3 mm and mesh diameter of said wire mesh sheet (2, 3) is 0.1 to 0.15 mm.

3. A substrate according to claim 1, wherein mesh number of said wire mesh sheet (2, 3) is from 30 to 500.

4. A substrate according to claim 1, wherein the construction of wire mesh sheet (2, 3) varies in x-direction, in y-direction and/or in z-direction of said wire mesh sheet.

5. A substrate according to claim 1, wherein the mesh diameter of wire mesh sheet (2, 3) varies in x-direction, in y-direction and/or in z-direction of said wire mesh sheet.

6. A substrate according to claim 1, wherein mesh number of the wire mesh sheet (2, 3) varies in x-direction, in y-direction and/or in z-direction of said wire mesh sheet.

7. A substrate according to claim 1, wherein the depth of the depression (2d, 3d) is 0.2-2.0 mm.

8. A substrate according to claim 1, wherein the height of the corrugation (3c) is 0.5-4.0 mm, preferably 1.0-3.0 mm.

9. A substrate according to claim 1, wherein said flat wire mesh sheet (2) and said corrugated wire mesh sheet (3) are attached to each other by welding or by brazing.

10. A substrate according to claim 1, wherein said sheets (2, 3) are at least partially covered by support and/or catalytic material.

11. A method for using a substrate according to claim 1 for purifying exhaust gases (EG) including flowing the exhaust gas through the substrate.

12. A method for manufacturing a substrate having corrugated sheet(s) and flat wire mesh sheet(s), and between said flat sheet(s) and said corrugated wire mesh sheet(s) there are at least partially open channels (POC) for treating exhaust gases of combustion engines, wherein said corrugated sheet is a corrugated wire mesh (3) sheet having depressions (3d) and said flat wire mesh sheet (2) have depressions (2d), and the depth of depression (2d) of said flat wire mesh sheet (2) is 0.05-2.0 mm smaller than the height of the corrugation (3c) of said corrugated sheet (3) and said wire mesh sheets (2, 3) have irregular surface having median opening size of 0.01 to 0.5 mm and mesh diameter 0.02 to 0.24 mm, and said depressions (3d) of the corrugated sheet (3) are matched to the depressions (2d) of the flat wire mesh sheet (2), and said wire mesh sheet (2, 3) is strengthened in inlet area of exhaust gas and at connection area of corrugated sheet(s) (3) and wire mesh sheet(s) (2).

13. A method according to claim 12, wherein said flat wire mesh sheet (2) is connected to said corrugated wire mesh sheet (3) by rolling.

14. A method according to claim 12, wherein said flat wire mesh sheet (2) is connected to said corrugated wire mesh sheet (3) by stacking or folding.

15. A method according to claim 12, wherein said flat wire mesh sheet (2) and said corrugated sheet (3) are attached to each other by welding or by brazing.

16. A substrate, comprising:
   a plurality of corrugated mesh sheets, each having geometric holes therethrough and a plurality of first depressions; and a plurality of flat wire mesh sheets, each having geometric holes therethrough and a plurality of second depressions, and each disposed between ones of said plurality corrugated mesh sheets forming a stacked arrangement of layered partially open channels for treating exhaust gases of combustion engines, wherein said second depressions of said flat wire mesh sheets are seated into corresponding portions of said plurality of corrugated mesh sheets disposed opposite to said first depressions, and first depressions of said corrugated mesh sheets are seated into said second depressions of said flat wire mesh sheets, and the exhaust gases flow through and between said stacked arrangement of layered partially open channels, and through the geometric holes of said corrugated mesh sheets and said flat wire mesh sheets.

17. A substrate according to claim 16, wherein at least one of a mesh diameter and a mesh number of said corrugated mesh sheets and said flat wire mesh sheets vary in x-direction, in y-direction and/or in z-direction.

18. A substrate according to claim 16, wherein said flat wire mesh sheets are connected to said corrugated mesh sheets by one of rolling, stacking, folding, welding or brazing.

19. A substrate according to claim 16, wherein at least one of said corrugated mesh sheets and said flat wire mesh sheets are at least partially covered by support and/or catalytic material.

20. A method for purifying exhaust gases using a substrate according to claim 16.

* * * * *